US012732802B2

(12) United States Patent
Mao et al.

(10) Patent No.: US 12,732,802 B2
(45) Date of Patent: Sep. 8, 2026

(54) DATA TRANSMISSION METHOD AND SYSTEM, ELECTRONIC DEVICE AND COMPUTER-READABLE STORAGE MEDIUM

(71) Applicant: ZTE CORPORATION, Shenzhen (CN)

(72) Inventors: Yuxin Mao, Shenzhen (CN); Qiang Wu, Shenzhen (CN); Xincheng Yan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 364 days.

(21) Appl. No.: 18/007,773

(22) PCT Filed: Jun. 1, 2021

(86) PCT No.: PCT/CN2021/097605

§ 371 (c)(1),
(2) Date: Dec. 2, 2022

(87) PCT Pub. No.: WO2021/244509

PCT Pub. Date: Dec. 9, 2021

(65) Prior Publication Data

US 2023/0232219 A1 Jul. 20, 2023

(30) Foreign Application Priority Data

Jun. 3, 2020 (CN) ......................... 202010497744.4

(51) Int. Cl.
*H04M 1/66* (2006.01)
*H04W 12/033* (2021.01)
(Continued)

(52) U.S. Cl.
CPC ....... *H04W 12/033* (2021.01); *H04W 12/041* (2021.01); *H04W 12/106* (2021.01)

(58) Field of Classification Search
CPC ............. H04W 12/033; H04W 12/041; H04W 12/106; H04W 12/06; H04W 12/069; H04W 12/12; H04W 12/02
See application file for complete search history.

(56) References Cited

U.S. PATENT DOCUMENTS 11,057,775 B2 7/2021 Zhang et al.
11,863,977 B2 * 1/2024 Lei ...................... H04W 12/033
(Continued)

FOREIGN PATENT DOCUMENTS

CN 108810884 A 11/2018
CN 109560929 A 4/2019
(Continued)

OTHER PUBLICATIONS

Japan Patent Office, First Office Action issued Sep. 19, 2023 for application No. JP2022-574816.
(Continued)

*Primary Examiner* — Shantell L Heiber
(74) *Attorney, Agent, or Firm* — Li & Cai Intellectual Property (USA) Office

(57) ABSTRACT

The present disclosure relates to the technical field of communication security, and provides a data transmission method applicable to a control plane function entity, including: determining target user plane data which needs to be subjected to security protection between a target user equipment and a user plane function entity; and sending a notification message to a Radio Access Network function entity and the target user equipment, with the notification message configured to instruct that the security protection is performed on the target user plane data between the target user equipment and the user plane function entity. The present disclosure further provides a data transmission system, an electronic device, and a computer-readable storage medium.

8 Claims, 8 Drawing Sheets

(51) Int. Cl.

| | |
|---|---|
| ***H04W 12/041*** | (2021.01) |
| ***H04W 12/106*** | (2021.01) |

(56) References Cited

U.S. PATENT DOCUMENTS

| | | | | |
|---|---|---|---|---|
| 2017/0332192 | A1* | 11/2017 | Edge | G01S 5/0036 |
| 2018/0317275 | A1* | 11/2018 | Chang | H04J 11/0089 |
| 2019/0349406 | A1* | 11/2019 | Pan | H04L 63/061 |
| 2019/0349763 | A1* | 11/2019 | Wu | H04W 12/0433 |
| 2020/0015088 | A1* | 1/2020 | Luo | H04W 12/041 |
| 2020/0084631 | A1* | 3/2020 | Zhang | H04W 12/106 |
| 2021/0168594 | A1 | 6/2021 | Wu et al. | |
| 2021/0409940 | A1* | 12/2021 | Wifvesson | H04L 9/0891 |

FOREIGN PATENT DOCUMENTS

| | | | |
|---|---|---|---|
| CN | 110574406 | A | 12/2019 |
| CN | 110830991 | A | 2/2020 |
| CN | 111194032 | A | 5/2020 |
| CN | 112788594 | A | 5/2021 |
| CN | 112838925 | A | 5/2021 |
| EP | 3557836 | A1 | 10/2019 |
| EP | 3611949 | A1 | 2/2020 |
| WO | WO 2018000936 | A1 | 1/2018 |
| WO | 2020087286 | A1 | 5/2020 |

OTHER PUBLICATIONS

Qualcomm Incorporated, "pCR: Solution for UE-UPF security setup", 3GPP TSG SA WG3 #86b S3-170834, Mar. 20, 2017.

ZTE, "Comparison of alt2 and alt4 in terms of establishment of Un bearer", 3GPP TSG RAN WG2 #67, R2-094696, Aug. 18, 2009.

WIPO, International Search Report issued on Jul. 22, 2021.

China Patent Office, First Office Action issued on Aug. 30, 2022 for application No. CN202010497744.4.

European Patent Office, The extended European search report issued May 21, 2024 for application No. EP21816696.5.

* cited by examiner

300 receive a notification message sent by a control plane function entity, with the notification message configured to instruct that security protection is performed on target user plane data between a target UE and a user plane function entity

FIG. 3

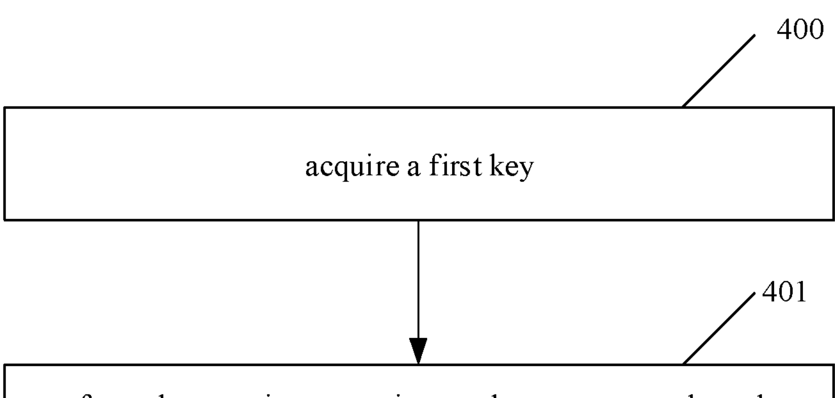

FIG. 4

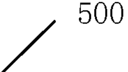

receive a notification message sent by a control plane function entity, with the notification message configured to instruct that security protection is performed on target user plane data between the UE and a user plane function entity

1202 key acquisition module first key second data processing module 1403
1402
1404
target UE
user plane function entity
RAN function entity
1401
control plane function entity

DATA TRANSMISSION METHOD AND SYSTEM, ELECTRONIC DEVICE AND COMPUTER-READABLE STORAGE MEDIUM

CROSS-REFERENCE TO RELATED APPLICATION

The present disclosure is a National Phase Application filed under 35 U.S.C. 371 as a national stage of PCT/CN2021/097605, filed on Jun. 1, 2021, an application claiming the priority to Chinese Patent Application No. 202010497744.4 filed with the CNIPA on Jun. 3, 2020, the entire contents of which are incorporated herein by reference.

TECHNICAL FIELD

Embodiments of the present disclosure relate to the technical field of communication security.

BACKGROUND

In the related technology, ciphering protection and/or integrity protection are performed during transmission of user plane data between a User Equipment (UE) and a Radio Access Network (RAN) function entity.

SUMMARY

In one aspect of the embodiments of the present disclosure, a data transmission method applicable to a control plane function entity is provided and includes: determining target user plane data which needs to be subjected to security protection between a target user equipment and a user plane function (UPF) entity; and sending a notification message to a Radio Access Network function entity and the target user equipment, wherein the notification message is configured to instruct that the security protection is performed on the target user plane data between the target user equipment and the user plane function entity.

In another aspect of the embodiments of the present disclosure, a data transmission method applicable to a Radio Access Network function entity is provided and includes: receiving a notification message sent by a control plane function entity, wherein the notification message is configured to instruct that security protection is performed on target user plane data between a target user equipment and a user plane function entity.

In still another aspect of the embodiments of the present disclosure, a data transmission method applicable to a user plane function entity is provided and includes: receiving a first key sent by a control plane function entity; or receiving a second key sent by the control plane function entity and generating the first key according to the second key; and performing security protection on target user plane data transmitted between a target user equipment and the user plane function entity with the first key.

In yet another aspect of the embodiments of the present disclosure, a data transmission method applicable to a target user equipment is provided and includes: receiving a notification message sent by a control plane function entity, wherein the notification message is configured to instruct that security protection is performed on target user plane data between the target user equipment and a user plane function entity.

In yet another aspect of the embodiments of the present disclosure, an electronic device is provided and includes: at least one processor; and a memory having at least one program stored thereon. When the at least one program is executed by the at least one processor, the at least one processor implements at least one operation of any one of the above data transmission methods.

In yet another aspect of the embodiments of the present disclosure, a computer-readable storage medium having a computer program stored thereon is provided. When the computer program is executed by a processor, at least one operation of any one of the above data transmission methods is performed.

In yet another aspect of the embodiments of the present disclosure, a data transmission system is provided and includes: a control plane function entity configured to determine target user plane data which needs to be subjected to security protection between a target user equipment and a user plane function entity, and send a notification message to a Radio Access Network function entity and the target user equipment, wherein the notification message is configured to instruct that the security protection is performed on the target user plane data between the target user equipment and the user plane function entity; the Radio Access Network function entity configured to receive the notification message sent by the control plane function entity; and the target user equipment configured to receive the notification message sent by the control plane function entity.

BRIEF DESCRIPTION OF DRAWINGS

FIG. 3 is a flowchart illustrating a data transmission method according to the present disclosure.

FIG. 4 is a flowchart illustrating a data transmission method according to the present disclosure.

FIG. 5 is a flowchart illustrating a data transmission method according to the present disclosure.

DETAIL DESCRIPTION OF EMBODIMENTS

Figure 1:
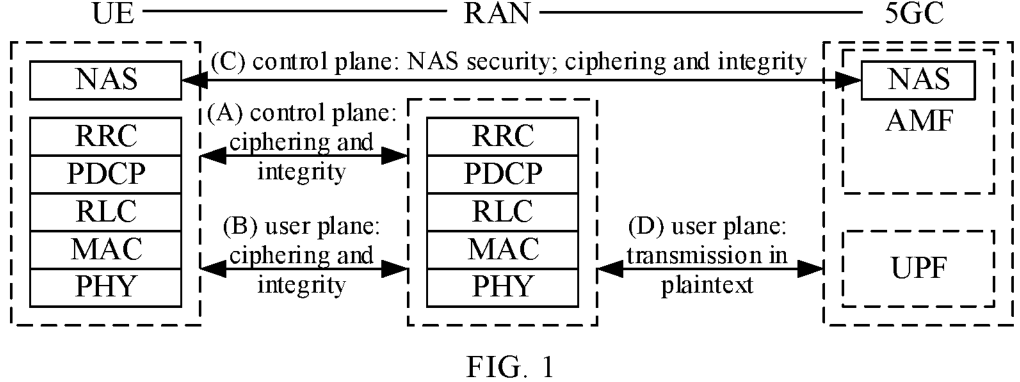
FIG. 1 is a schematic diagram illustrating a security protection mechanism in a 5th Generation Mobile Communication Technology (5G) network defined by the 3rd Generation Partnership Project (3GPP) R15 in the related technology.

In order to enable those of ordinary skill in the art to better understand the technical solutions of the present disclosure, a data transmission method, device and system, an electronic device, and a computer-readable storage medium provided by the present disclosure are described in detail below with reference to the drawings.

Exemplary embodiments will be described more fully below with reference to the drawings, but the exemplary embodiments may be embodied in different forms, and should not be interpreted as being limited to the embodiments described herein. Rather, the exemplary embodiments are provided to make the present disclosure thorough and complete, and are intended to enable those of ordinary skill in the art to fully understand the scope of the present disclosure.

Implementations of the present disclosure and the features therein may be combined with each other if no conflict is incurred.

The term "and/or" used herein includes any combination and all combinations of at least one associated listed item.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "comprise" and/or "be made of" used herein indicate(s) the presence of features, integers, operations, elements and/or components, but do not exclude the presence or addition of at least one other feature, integer, operation, element, component and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

Due to deep binding of software and hardware, related communication networks are single in network performance, poor in networking flexibility and limited in expansion. It is difficult to build one network to adapt to different requirements of different applications for network service performance such as bandwidth, delay, reliability and the like. The 5G technology carries out deep reconstruction on network architecture, introduces service architecture based on the virtualization technology and the software-defined technology, constructs virtualized network functions on a shared centralized hardware platform according to application requirements, and provides network service performance more suitable for the application requirements by constructing network slices. For example, for an application of the Internet of Things involving a terminal having a fixed position, a mobility management function does not need to be introduced in when a network slice is constructed to provide a network service for the application; and for a low-latency application, a user plane function needs to be sunk to an edge of a network to be deployed when a network slice is constructed, so as to shorten a data transmission delay to meet a requirement of the application for a network delay. That is, the 5G technology can provide network services having different characteristics for different applications with the aid of emerging technologies such as the virtualization technology and the network slicing technology.

When providing network services for applications in various industries, the 5G networks bear various high-value application data and sensitive data such as privacy data. Attacks on the networks for acquiring or tampering with data have never ended, and the attack means are continuously developing and evolving as the service data borne by the 5G networks become richer and richer in the future. Therefore, protection measures for integrity and ciphering of data are indispensable for transmission of data in the networks.

The ciphering protection refers to performing encryption during the transmission of data, so as to prevent the data from being wiretapped and illegally acquired during the transmission; and the integrity protection refers to performing integrity processing on transmitted data at a sending end and performing integrity verification on the transmitted data at a receiving end, so as to prevent the data from being tampered with during the transmission.

The data transmitted in the 5G networks is divided into two broad categories: control plane signaling data, such as signaling for a user to register with a network and session signaling of a slice of an RAN function entity; and user plane data for a user to perform a service, such as data of an online video service.

FIG. 1 is a schematic diagram illustrating a security protection mechanism in a data transmission process in a 5G network defined by the 3GPP R15. As shown in FIG. 1, A represents performing ciphering protection and/or integrity protection on control plane data between a UE and an RAN function entity, and B represents performing ciphering protection and/or integrity protection on user plane data between the UE and the RAN function entity; and C represents performing ciphering protection and/or integrity protection on control plane data between the UE and a 5G Core network (5GC), but ciphering protection and/or integrity protection for transmission of user plane data between the UE and the 5GC is not yet requested, and the user plane data is transmitted in the form of plaintext between the RAN and the 5GC, as represented by D in FIG. 1.

When the 5G networks provide network services for vertical industries, the user plane data needs to be subjected to security protection along a transmission path from the UE to the 5GC based on service characteristics of the vertical industries themselves mainly for the following reasons (1) to (3).

(1) Configurations of the RAN function entity are easily exposed, so that the configurations such as encryption, authentication, and user-plane integrity protection at the side of the RAN function entity are prone to be attacked.

(2) Compared with the side of the RAN function entity, network nodes at the side of the core network have better computing capabilities, which facilitates reducing data interaction delay, and low-latency experiences are usually highly valued by the vertical industries.

(3) A network slice operator (the operator which provides network services for applications of the vertical industries) may lease RAN resources from other operators. From the perspective of the network slice operator or the applications of the vertical industries, the RAN function entity is not a device that can be absolutely trusted. Therefore, the network slice operator or the applications of the vertical industries expect that security protection for the data transmission does not end until the data reaches the core network, rather than ending just when the data reaches the side of the RAN function entity of the RAN.

In view of the above requirements for security protection, part of the requirements can be met with the following method: protection between the UE and the RAN function entity can be carried out with the method illustrated by B in FIG. 1, an encrypted channel is established between network elements at a boundary of the RAN and network elements at a boundary of the core network using, for example, the Internet Protocol Security (IPSec), as shown by D in FIG. 1, and all data transmitted between the network elements at the boundary of the RAN and the network elements at the boundary of the core network is encrypted and/or is subjected to integrity protection. Such method can achieve security protection of the user plane data between the UE and the 5GC, but has the following disadvantages 1) to 3).

1) All data transmitted between the network elements at the boundary of the RAN and the network elements at the boundary of the core network is encrypted and/or subjected to integrity protection, and the data is encrypted whether the data has an encryption requirement or not, which reduces processing efficiency and increases service delay.

2) Since the RAN function entity still participates in data encryption and decryption and/or integrity verification, the above-mentioned risks of data security caused by the untrusted RAN function entity and the attacks on the RAN function entity still exists.

3) The security of the user plane data is guaranteed by protection mechanisms such as application layer encryption provided by an application itself, for example, some application programs encrypt transmitted application data using the Secure Sockets Layer (SSL). However, not all applications have the functions of encrypting the user plane data at the application layer and performing integrity protection and integrity verification on the user plane data at the application layer. So, for each application program, the above method is a dedicated method, so that the method cannot be easily popularized.

At present, merely the transmission of the user plane data between the UE and the RAN function entity is subjected to ciphering protection and/or integrity protection, the transmission of the user plane data between the RAN and the core network is not subjected to ciphering protection and/or integrity protection. Transmission of the user plane data between the UE and the core network needs to be subjected to ciphering protection and/or integrity protection in some scenarios, but the above method cannot meet protection requirements of those scenarios.

Figure 2:
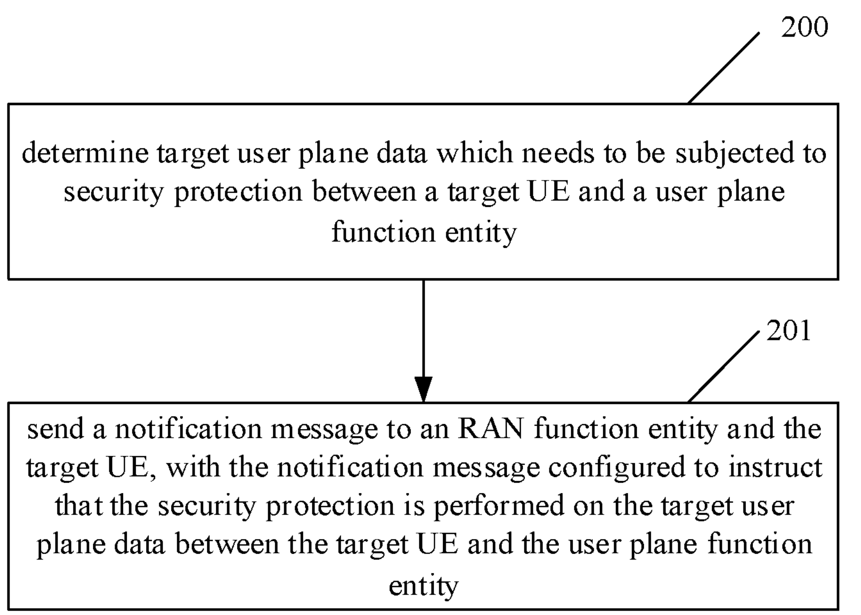
FIG. 2 is a flowchart illustrating a data transmission method according to the present disclosure.

The present disclosure provides a data transmission method applicable to a control plane function entity. With reference to FIG. 2 which is a flowchart illustrating the data transmission method according to the present disclosure, the method includes operation 200 and operation 201.

In operation 200, target user plane data which needs to be subjected to security protection between a target UE and a user plane function entity is determined.

In an implementation, determination of which user plane data needs to be subjected to the security protection between the target UE and the user plane function entity may be carried out according to user subscription information. Apparently, there are many other determination ways, and a specific determination strategy is not used to limit the scope of the embodiment of the present disclosure and is not described in detail here.

In an implementation, the target user plane data which needs to be subjected to the security protection between the target UE and the user plane function entity may be determined during a registration process of the target UE with a core network. For example, the target user plane data which needs to be subjected to the security protection between the target UE and the user plane function entity is determined after an authentication process is completed. In this case, the target user plane data is all user plane data of the target UE.

In another implementation, the target user plane data which needs to be subjected to the security protection between the target UE and the user plane function entity may be determined during a Protocol Data Unit (PDU) session establishment process. For example, the target user plane data which needs to be subjected to the security protection between the target UE and the user plane function entity is determined after a PDU session context establishment response is received from a Session Management Function (SMF) entity. In this case, the target user plane data is user plane data corresponding to a PDU session.

In operation 201, a notification message is sent to an RAN function entity and the target UE, with the notification message configured to instruct that the security protection is performed on the target user plane data between the target UE and the user plane function entity.

In an implementation, the notification message may be sent to the RNA function entity and the target UE during the registration progress of the UE with the core network. For example, the notification message is sent to the RAN function entity and the target UE after the authentication process is completed. After receiving the notification message, the UE confirms that the security protection needs to be performed on the target user plane data between the UE and the user plane function entity; and after receiving the notification message, the RAN function entity confirms that the security protection needs to be performed on the target user plane data between the UE registering with the core network and the user plane function entity. In this case, the notification message is configured to instruct that the security protection is performed on all the user plane data of the UE between the target UE and the user plane function entity.

In another implementation, the notification message may be sent to the RNA function entity and the UE during the PDU session establishment process. For example, the notification message is sent to the RAN function entity and the UE after the PDU session context establishment response is received from the SMF entity. In this case, the notification message is configured to instruct that the security protection is performed on the user plane data corresponding to the PDU session of the UE between the UE and the user plane function entity.

That is, for some UEs, after it is determined that all the user plane data of the UE need to be subjected to the security protection between the target UE and the user plane function entity, the notification message is sent to the RAN function entity and the UE; and for some other UEs, after it is determined that none of the user plane data of the target UE needs to be subjected to the security protection between the target UE and the user plane function entity, no notification message is sent to the RAN function entity or the UE. Thus, instead of subjecting the user plane data of all the UEs to the security protection between the UEs and the user plane function entity, the user plane data of part of the UEs is subjected to the security protection between the UEs and the user plane function entity, a specific UE whose user plane data needs to be subjected to the security protection between the UE and the user plane function entity may be determined according to subscription data of the UE, and a user of the UE may subscribe to an operator according to his/her own needs.

Alternatively, for some PDU sessions of a certain UE, after it is determined that the user plane data corresponding to the PDU session needs to be subjected to the security protection between the UE and the user plane function entity, the notification message is sent to the RAN function entity and the UE; for the other PDU sessions of the UE, after it is determined that the user plane data corresponding to the PDU session does not need to be subjected to the security protection between the UE and the user plane function entity, no notification message is sent to the RAN function entity or the UE. Thus, instead of subjecting the user plane data corresponding to all the PDU sessions of the UE to the security protection between the UE and the user plane function entity, the user plane data corresponding to part of the PDU sessions of the UE is subjected to the security protection between the UE and the user plane function entity, a specific PDU session of the UE whose corresponding user plane data needs to be subjected to the security protection between the UE and the user plane function entity may be determined according to the subscription data of the UE, and a user of the UE may subscribe to an operator according to his/her own needs.

In an implementation, the method may further include: acquiring a first key, and sending the first key to the user plane function entity. The first key is configured to be used by the user plane function entity and the target UE to perform the security protection on the target user plane data between the target UE and the user plane function entity.

In an implementation, the first key is a key for performing the security protection on the target user plane data between the target UE and the user plane function entity.

In an implementation, the first key may directly adopt a key for performing the security protection on the target user plane data between the target UE and the RAN function entity. In another implementation, the first key may also directly adopt a key for performing the security protection on control plane data between the target UE and the RAN function entity.

In an implementation, the first key may include an encryption key. In another implementation, the first key may include an integrity key. In still another implementation, the first key may include an encryption key and an integrity key.

In an implementation, the encryption key is used for ciphering protection of the target user plane data between the UE and the user plane function entity, and the integrity key is used for integrity protection of the target user plane data between the UE and the user plane function entity.

In an implementation, the first key is a first key corresponding to the target UE, and first keys corresponding to different target UEs may be the same as one another or different from one another.

In another implementation, the first key is a first key corresponding to a PDU session of the target UE. Specifically, one PDU session may correspond to one first key, or two or more PDU sessions may correspond to one first key.

In an implementation, the first key may be acquired with either of the following methods: the first method is receiving the first key returned from the RAN function entity, and the second method is receiving the first key returned from the target UE.

In an implementation, in order to improve security during transmission of the first key, the first key returned from the target UE may be received through a Non-Access Stratum (NAS) secure channel.

In an implementation, the method may further include: generating a second key, and sending the second key to the user plane function entity. The second key is configured to be used by the user plane function entity to generate the first key.

In an implementation, the second key is configured to generate the first key, and the first key is the key for performing the security protection on the target user plane data between the UE and the user plane function entity.

In an implementation, the second key is used for key isolation, so as to avoid an influence of exposure of one key on security of the other keys, thereby improving the security.

In an implementation, an anchor key may be generated first, and then the second key may be generated according to the anchor key.

According to the data transmission method provided by the present disclosure, the control plane function entity determines the target user plane data which needs to be subjected to the security protection between the target UE and the user plane function entity, and then notifies the RAN function entity and the target UE, so as to allow the target UE and the user plane function entity to perform the security protection on the target user plane data, thus achieving the security protection of the target user plane data between the target UE and the user plane function entity.

The present disclosure further provides a data transmission method applicable to an RAN function entity. With reference to FIG. 3 which is a flowchart illustrating the data transmission method according to the present disclosure, the method may include operation 300.

In operation 300, a notification message sent by a control plane function entity is received, with the notification message configured to instruct that security protection is performed on target user plane data between a target UE and a user plane function entity.

In an implementation, the notification message sent by the control plane function entity may be received during a registration progress of the target UE with a core network. For example, the notification message sent by the control plane function entity is received after an authentication process is completed. In this case, the notification message is configured to instruct that the security protection is performed on all user plane data of the target UE between the target UE and the user plane function entity.

In another implementation, the notification message sent by the control plane function entity may be received during a PDU session establishment process. For example, the notification message sent by the control plane function entity is received after an N4 session is established between an SMF entity and the user plane function entity. In this case, the notification message is configured to instruct that the security protection is performed on user plane data corresponding to a PDU session of the target UE between the target UE and the user plane function entity.

It should be noted that, for some UEs, if the notification message sent by the control plane function entity is received during the registration process of the UE with the core network, it is indicated that the security protection needs to be performed on all the user plane data of the UE between the UE and the user plane function entity; and for some other UEs, if no notification message is received from the control plane function entity during the registration process of the UE with the core network, it is indicated that the security protection does not need to be performed on all the user plane data of the UE between the UE and the user plane function entity. Thus, instead of subjecting the user plane data of all the UEs to the security protection between the UEs and the user plane function entity, the user plane data of part of the UEs is subjected to the security protection between the UEs and the user plane function entity, a specific UE whose user plane data needs to be subjected to the security protection between the UE and the user plane function entity may be determined according to subscription data of the UE, and a user of the UE may subscribe to an operator according to his/her own needs.

Alternatively, for some PDU sessions of the target UE, if the notification message sent by the control plane function entity is received during the PDU session establishment processes, it is indicated that the security protection needs to be performed on the user plane data corresponding to the PDU sessions between the target UE and the user plane function entity; and for the other PDU sessions, if no notification message is received from the control plane function entity during the PDU session establishment processes, it is indicated that the security protection does not need to be performed on the user plane data corresponding to the PDU sessions between the target UE and the user plane function entity. Thus, instead of subjecting the user plane data corresponding to all the PDU sessions of the UE to the security protection between the UE and the user plane function entity, the user plane data corresponding to part of the PDU sessions of the UE is subjected to the security protection between the UE and the user plane function entity, a specific PDU session of the UE whose corresponding user plane data needs to be subjected to the security protection between the UE and the user plane function entity may be determined according to the subscription data of the UE, and a user of the UE may subscribe to an operator according to his/her own needs.

In an implementation, after receiving the notification message sent by the control plane function entity, the method may further include: sending a first key to the control plane function entity. The first key is configured to be used by the user plane function entity and the target UE to perform the security protection on the target user plane data between the target UE and the user plane function entity.

In an implementation, the first key is a key for performing the security protection on the target user plane data between the target UE and the user plane function entity.

In an implementation, the first key may directly adopt a key for performing the security protection on the target user plane data between the target UE and the RAN function entity. In another implementation, the first key may also directly adopt a key for performing the security protection on control plane data between the target UE and the RAN function entity.

In an implementation, the first key may include an encryption key. In another implementation, the first key may include an integrity key. In still another implementation, the first key may include an encryption key and an integrity key.

In an implementation, the encryption key is used for ciphering protection of the target user plane data between the target UE and the user plane function entity, and the integrity key is used for integrity protection of the target user plane data between the target UE and the user plane function entity.

In an implementation, after receiving the notification message sent by the control plane function entity, the method may further include: determining whether user plane data received by the RAN function entity is the target user plane data according to the notification message; and, if the user plane data received by the RAN function entity is the target user plane data, performing protocol conversion on the target user plane data and then forwarding the target user plane data, without performing the security protection on the target user plane data.

Specifically, the protocol conversion is performed on received uplink target user plane data of the target UE, and the uplink target user plane data already subjected to the protocol conversion is sent to the user plane function entity; and the protocol conversion is performed on received downlink target user plane data of the target UE, and the downlink target user plane data already subjected to the protocol conversion is sent to the target UE.

In another implementation, after it is determined that the user plane data received by the RAN function entity is not the target user plane data, the method may further include: processing the user plane data according to the related technology. For example, if the received user plane data is the user plane data subjected to the security protection between the target UE and the RAN function entity, security protection processing is performed on the received user plane data, for example, the received uplink user plane data of the UE is subjected to integrity verification, and then are decrypted after being verified, and the decrypted uplink user plane data is subjected to the protocol conversion. If the received user plane data is not the user plane data subjected to the security protection between the target UE and the RAN function entity, the received user plane data is subjected to the protocol conversion and then forwarded, without being subjected to the security protection processing, for example, the uplink user plane data of the target UE is subjected to the protocol conversion and then forwarded.

According to the data transmission method provided by the present disclosure, the control plane function entity determines the target user plane data which needs to be subjected to the security protection between the target UE and the user plane function entity, and then notifies the RAN function entity and the target UE, so as to allow the target UE and the user plane function entity to perform the security protection on the target user plane data, thus achieving the security protection of the target user plane data between the target UE and the user plane function entity; moreover, the RAN function entity does not participate in the security protection of the target user plane data between the target UE and the user plane function entity, and just transmits the target user plane data, which is transmitted between the target UE and the user plane function entity, in a transparent transmission manner, so that the data transmission method is applicable to the scenarios where the RAN function entities are not trusted and are prone to be attacked.

The present disclosure further provides a data transmission method applicable to a user plane function entity. With reference to FIG. 4 which is a flowchart illustrating the data transmission method according to the present disclosure, the method may include operation 400 and operation 401.

In operation 400, a first key is acquired.

In an implementation, the first key is a key for performing security protection on target user plane data between a target UE and the user plane function entity.

In an implementation, the first key corresponding to a UE may be acquired with either of the following methods: the first method is receiving the first key corresponding to the UE from a control plane function entity; and the second method is receiving a second key corresponding to the UE from the control plane function entity, and generating the first key according to the second key.

Apparently, the first key may also be acquired with other methods, and a specific acquisition method is not used to limit the scope of the embodiment of the present disclosure. What is emphasized by the present disclosure is that the first key belongs to a key for performing the security protection on the target user plane data between the target UE and the user plane function entity, and belongs to a key between the target UE and an RAN function entity, and the RAN function entity does not participate in the security protection of the target user plane data between the target UE and the user plane function entity.

In an implementation, the first key may directly adopt a key for performing the security protection on the target user plane data between the target UE and the RAN function entity. In another implementation, the first key may also directly adopt a key for performing the security protection on control plane data between the target UE and the RAN function entity. The solution is implemented by adopting a security protection key between the target UE and the RAN function entity, and simplifies an acquisition process of the security protection key.

In an implementation, the first key may include an encryption key. In another implementation, the first key may include an integrity key. In still another implementation, the first key may include an encryption key and an integrity key.

In an implementation, the encryption key is used for ciphering protection of the target user plane data between the target UE and the user plane function entity, and the integrity key is used for integrity protection of the target user plane data between the target UE and the user plane function entity.

In an implementation, the second key is used for key isolation, so as to avoid an influence of exposure of one key on security of the other keys, thereby improving the security.

It should be noted that, for some UEs, if the first key corresponding to the UE is acquired, it is indicated that the security protection needs to be performed on all user plane data of the UE between the UE and the user plane function entity; and for some other UEs, if the first key corresponding to the UE is not acquired, it is indicated that the security protection does not need to be performed on all user plane data of the UE between the UE and the user plane function entity. Thus, instead of subjecting the user plane data of all the UEs to the security protection between the UEs and the user plane function entity, the user plane data of part of the UEs is subjected to the security protection between the UEs and the user plane function entity, a specific UE whose user plane data needs to be subjected to the security protection between the UE and the user plane function entity may be determined according to subscription data of the UE, and a user of the UE may subscribe to an operator according to his/her own needs.

Alternatively, for some PDU sessions of a certain UE, if a first key corresponding to the PDU session is acquired, it is indicated that the security protection needs to be performed on user plane data corresponding to the PDU session between the UE and the user plane function entity; and for the other PDU sessions, if a first key corresponding to the PDU session is not acquired, it is indicated that the security protection does not need to be performed on user plane data corresponding to the PDU session between the UE and the user plane function entity. Thus, instead of subjecting the user plane data corresponding to all the PDU sessions of the UE to the security protection between the UE and the user plane function entity, the user plane data corresponding to part of the PDU sessions of the UE is subjected to the security protection between the UE and the user plane function entity, a specific PDU session of the UE whose corresponding user plane data needs to be subjected to the security protection between the UE and the user plane function entity may be determined according to the subscription data of the UE, and a user of the UE may subscribe to an operator according to his/her own needs.

In operation 401, the security protection is performed on the target user plane data transmitted between the target UE and the user plane function entity with the first key.

In an implementation, performing the security protection on the target user plane data transmitted between the target UE and the user plane function entity with the first key may include: encrypting, with a ciphering key, the target user plane data sent to the target UE; and decrypting, with the ciphering key, the target user plane data received from the target UE.

In another implementation, performing the security protection on the target user plane data transmitted between the target UE and the user plane function entity with the first key may include: performing, with an integrity key, integrity protection on the target user plane data sent to the target UE; and performing, with the integrity key, integrity verification on the target user plane data received from the target UE.

In another implementation, performing the security protection on the target user plane data transmitted between the target UE and the user plane function entity with the first key may include: encrypting, with the ciphering key, the target user plane data sent to the target UE, and performing, with the integrity key, the integrity protection on the target user plane data.

In another implementation, performing the security protection on the target user plane data transmitted between the target UE and the user plane function entity with the first key may include: performing, with the integrity key, the integrity verification on the target user plane data received from the target UE, and decrypting, with the ciphering key, the target user plane data after the target user plane data is verified.

In an implementation, performing the security protection on the target user plane data transmitted between the target UE and the user plane function entity with the first key may include: before performing Packet Data Convergence Protocol (PDCP) encapsulation on the downlink target user plane data sent to the target UE, performing first security protection processing on the downlink target user plane data with the first key, and sending the downlink target user plane data already subjected to the first security protection processing to the RAN function entity.

After the PDCP encapsulation is performed on the uplink target user plane data which is already subjected to the first security protection processing and received from the UE, second security protection processing is performed, with the first key, on the uplink target user plane data already subjected to the first security protection processing.

The security protection solution is implemented through a PDCP layer, rather than through an application layer, so that the security protection solution is easier to be popularized.

In an implementation, the first key is a first key corresponding to the target UE, the downlink target user plane data sent to the target UE are all downlink user plane data sent by a core network to the target UE, and the uplink target user plane data which is already subjected to the first security protection processing and received from the target UE is all uplink user plane data received by the user plane function entity from the target UE.

That is to say, all the downlink user plane data sent by the user plane function entity to the target UE is subjected to the first security protection processing with the first key, and all the user plane data received from the target UE is subjected to the second security protection processing with the first key.

In another implementation, the first key is a first key corresponding to a PDU session of the target UE. Specifically, one PDU session may correspond to one first key, or two or more PDU sessions may correspond to one first key. Then, the downlink target user plane data sent to the target UE is downlink user plane data sent by the core network to the target UE through the PDU session, and the uplink target user plane data which is already subjected to the first security protection processing and received from the target UE is uplink user plane data received by the user plane function entity from the UE through the PDU session.

That is to say, the downlink user plane data, which is sent by the user plane function entity to the target UE through the PDU session corresponding to the first key, is subjected to the first security protection processing with the first key, while the downlink user plane data, which is sent by the user plane function entity to the UE through PDU sessions not corresponding to the first key (i.e., the PDU sessions except the PDU session corresponding to the first key), does not need to be subjected to the first security protection processing and is processed according to the related technology; similarly, the uplink user plane data received from the target UE through the PDU session corresponding to the first key is subjected to the second security protection processing with the first key, while the uplink user plane data, which is received from the target UE through the PDU sessions not corresponding to the first key (i.e., the PDU sessions except the PDU session corresponding to the first key), does not need to be subjected to the second security protection processing and is processed according to the related technology.

In the above exemplary implementations, instead of performing the security protection on all the user plane data of the UE, the security protection is merely performed on the user plane data transmitted with the UE through part of the PDU sessions, so that the processing efficiency of the user plane data which does not need to be subjected to the security protection is improved, and the service delay is reduced.

In an implementation, the security protection may be any one of the following three cases: a case where the security protection includes the ciphering protection, a case where the security protection includes the integrity protection, and a case where the security protection includes the ciphering protection and the integrity protection. The three cases are respectively described below.

(1) In the case where the security protection includes the ciphering protection alone, the first key includes the encryption key alone. Correspondingly, performing the first security protection processing on the downlink target user plane data with the first key includes: encrypting the downlink target user plane data with the encryption key. Performing the second security protection processing on the uplink target user data already subjected to the first security protection processing with the first key includes: decrypting the encrypted uplink target user data with the encryption key.

(2) In the case where the security protection includes the integrity protection alone, the first key includes the integrity key alone. Correspondingly, performing the first security protection processing on the downlink target user plane data with the first key includes: performing integrity protection on the downlink target user plane data with the integrity key. Performing the second security protection processing on the uplink target user plane data already subjected to the first security protection processing with the first key includes: performing, with the integrity key, the integrity verification on the uplink target user plane data already subjected to the integrity protection.

(3) In the case where the security protection includes both the ciphering protection and the integrity protection, the first key includes the encryption key and the integrity key. Correspondingly, performing the first security protection processing on the downlink target user plane data with the first key includes: encrypting the downlink target user plane data with the encryption key, and performing the integrity protection on the encrypted downlink target user plane data with the integrity key. Performing the second security protection processing on the uplink target user plane data already subjected to the first security protection processing with the first key includes: performing, with the integrity key, the integrity verification on the uplink target user plane data which is already encrypted and subjected to the integrity protection, and decrypting the encrypted uplink target user data with the encryption key after the encrypted uplink target user data is verified.

According to the data transmission method provided by the present disclosure, the control plane function entity determines the target user plane data which needs to be subjected to the security protection between the target UE and the user plane function entity, and then notifies the RAN function entity and the target UE, so as to allow the target UE and the user plane function entity to perform the security protection on the target user plane data, thus achieving the security protection of the target user plane data between the target UE and the user plane function entity.

The present disclosure further provides a data transmission method applicable to a UE. With reference to FIG. 5 which is a flowchart illustrating the data transmission method according to the present disclosure, the method may include operation 500.

In operation 500, a notification message sent by a control plane function entity is received, with the notification message configured to instruct that security protection is performed on target user plane data between the UE and a user plane function entity.

It should be noted that, for some UEs, if the notification message sent by the control plane function entity is received during a registration process of the UE with a core network, it is indicated that the security protection needs to be performed on all user plane data of the UE between the UE and the user plane function entity; and for some other UEs, if no notification message is received from the control plane function entity during the registration process of the UE with the core network, it is indicated that the security protection does not need to be performed on all user plane data of the UE between the UE and the user plane function entity. Thus, instead of subjecting the user plane data of all the UEs to the security protection between the UEs and the user plane function entity, the user plane data of part of the UEs is subjected to the security protection between the UEs and the user plane function entity, a specific UE whose user plane data needs to be subjected to the security protection between the UE and the user plane function entity may be determined according to subscription data of the UE, and a user of the UE may subscribe to an operator according to his/her own needs.

Alternatively, for some PDU sessions of a certain UE, if the notification message sent by the control plane function entity is received during the PDU session establishment processes, it is indicated that the security protection needs to be performed on user plane data corresponding to the PDU sessions between the UE and the user plane function entity; and for the other PDU sessions, if no notification message is received from the control plane function entity during the PDU session establishment processes, it is indicated that the security protection does not need to be performed on the user plane data corresponding to the PDU sessions between the UE and the user plane function entity. Thus, instead of subjecting the user plane data corresponding to all the PDU sessions of the UE to the security protection between the UE and the core network, the user plane data corresponding to part of the PDU sessions of the UE is subjected to the security protection between the UE and the user plane function entity, a specific PDU session of the UE whose corresponding user plane data needs to be subjected to the security protection between the UE and the user plane function entity may be determined according to the subscription data of the UE, and a user of the UE may subscribe to an operator according to his/her own needs.

In an implementation, after receiving the notification message, the method may further include: generating a first key, and sending the first key to the control plane function entity. The first key includes a ciphering key and/or an integrity key.

In an implementation, the first key may directly adopt a key for performing the security protection on the target user plane data between the UE and an RAN function entity. In another implementation, the first key may also directly adopt a key for performing the security protection on control plane data between the UE and the RAN function entity. The solution is implemented by adopting a security protection key between the UE and the RAN function entity, and simplifies an acquisition process of the security protection key.

In an implementation, the first key may include an encryption key. In another implementation, the first key may include an integrity key. In still another implementation, the first key may include an encryption key and an integrity key. In an implementation, the encryption key is used for ciphering protection of the target user plane data between the UE and the user plane function entity, and the integrity key is used for integrity protection of the target user plane data between the UE and the user plane function entity.

In an implementation, the first key is sent to the control plane function entity through an NAS secure channel, which improves security during transmission of the first key.

In another implementation, the first key does not need to be sent to the control plane function entity, the control plane function entity sends a second key to the user plane function entity, and the user plane function entity generates the first key according to the second key. The second key is used for key isolation, so as to avoid an influence of exposure of one key on security of the other keys, thereby improving the security.

In an implementation, the method may further include: performing the security protection on the target user plane data transmitted between the UE and the user plane function entity with the first key.

In an implementation, performing the security protection on the target user plane data transmitted between the UE and the user plane function entity with the first key may include: encrypting, with the ciphering key, the target user plane data sent to the user plane function entity; and decrypting, with the ciphering key, the target user plane data received from the user plane function entity.

In another implementation, performing the security protection on the target user plane data transmitted between the UE and the user plane function entity with the first key may include: performing, with the integrity key, integrity protection on the target user plane data sent to the user plane function entity; and performing, with the integrity key, integrity verification on the target user plane data received from the user plane function entity.

In another implementation, performing the security protection on the target user plane data transmitted between the UE and the user plane function entity with the first key may include: encrypting, with the ciphering key, the target user plane data sent to the user plane function entity, and performing, with the integrity key, the integrity protection on the encrypted target user plane data.

In another implementation, performing the security protection on the target user plane data transmitted between the UE and the user plane function entity with the first key may include: performing, with the integrity key, the integrity verification on the target user plane data received from the user plane function entity, and decrypting, with the ciphering key, the target user plane data after the target user plane data is verified.

In an implementation, performing the security protection on the target user plane data transmitted between the UE and the user plane function entity with the first key may include: before performing PDCP encapsulation on the uplink target user plane data sent to the user plane function entity, performing first security protection processing on the uplink target user plane data with the first key, and sending the uplink target user plane data already subjected to the first security protection processing to the RAN function entity.

After PDCP de-encapsulation is performed on the downlink target user plane data which is already subjected to the first security protection processing and received from the user plane function entity, second security protection processing is performed, with the first key, on the downlink target user plane data already subjected to the first security protection processing.

The security protection solution is implemented through the PDCP layer, rather than through the application layer, so that the security protection solution is easier to be popularized.

In an implementation, the first key is a first key corresponding to the UE, the uplink target user plane data sent to the user plane function entity are all uplink user plane data sent by the UE to the user plane function entity, and the downlink target user plane data which is already subjected to the first security protection processing and received from the user plane function entity are all downlink user plane data received by the UE from the user plane function entity.

That is to say, all the uplink user plane data sent by the UE to the user plane function entity is subjected to the first security protection processing with the first key, and all the downlink user plane data received from the user plane function entity is subjected to the second security protection processing with the first key.

In another implementation, the first key is a first key corresponding to a PDU session of the UE. Specifically, one PDU session may correspond to one first key, or two or more PDU sessions may correspond to one first key. Then, the uplink target user plane data sent to the user plane function entity is uplink user plane data sent by the UE to the user plane function entity through the PDU session, and the downlink target user plane data which is already subjected to the first security protection processing and received from the user plane function entity is downlink user plane data received by the UE from the user plane function entity through the PDU session.

That is to say, the uplink user plane data, which is sent by the UE to the user plane function entity through the PDU session corresponding to the first key, is subjected to the first security protection processing with the first key, while the uplink user plane data, which is sent by the UE to the user plane function entity through PDU sessions not corresponding to the first key (i.e., the PDU sessions except the PDU session corresponding to the first key), does not need to be subjected to the first security protection processing and are processed according to the related technology; similarly, the downlink user plane data received from the user plane function entity through the PDU session corresponding to the first key is subjected to the second security protection processing with the first key, while the downlink user plane data, which is received from the user plane function entity through the PDU sessions not corresponding to the first key (i.e., the PDU sessions except the PDU session corresponding to the first key), does not need to be subjected to the second security protection processing and is processed according to the related technology.

In the above exemplary implementations, instead of performing the security protection on all the user plane data of the UE, the security protection is merely performed on the user plane data transmitted with the user plane function entity through part of the PDU sessions, so that the processing efficiency of the user plane data which does not need to be subjected to the security protection is improved, and the service delay is reduced.

In an implementation, the security protection may be any one of the following three cases: a case where the security protection includes the ciphering protection, a case where the security protection includes the integrity protection, and a case where the security protection includes the ciphering protection and the integrity protection. The three cases are respectively described below.

(1) In the case where the security protection includes the ciphering protection alone, the first key includes the encryption key alone. Correspondingly, performing the first security protection processing on the uplink target user plane data with the first key includes: encrypting the uplink target user plane data with the encryption key. Performing the second security protection processing on the downlink target user data already subjected to the first security protection processing with the first key includes: decrypting the encrypted downlink target user data with the encryption key.

(2) In the case where the security protection includes the integrity protection alone, the first key includes the integrity key alone. Correspondingly, performing the first security protection processing on the uplink target user plane data with the first key includes: performing integrity protection on the uplink target user plane data with the integrity key. Performing the second security protection processing on the downlink target user plane data already subjected to the first security protection processing with the first key includes: performing, with the integrity key, the integrity verification on the downlink target user plane data already subjected to the integrity protection.

(3) In the case where the security protection includes both the ciphering protection and the integrity protection, the first key includes the encryption key and the integrity key. Correspondingly, performing the first security protection processing on the uplink target user plane data with the first key includes: encrypting the uplink target user plane data with the encryption key, and performing the integrity protection on the encrypted uplink target user plane data with the integrity key. Performing the second security protection processing on the downlink target user plane data already subjected to the first security protection processing with the first key includes: performing, with the integrity key, the integrity verification on the downlink target user plane data which is already encrypted and subjected to the integrity protection, and decrypting the encrypted downlink target user data with the encryption key after the encrypted uplink target user data is verified.

According to the data transmission method provided by the present disclosure, the control plane function entity determines the target user plane data which needs to be subjected to the security protection between the UE and the user plane function entity, and then notifies the RAN function entity and the UE, so as to allow the UE and the user plane function entity to perform the security protection on the target user plane data, thus achieving the security protection of the target user plane data between the UE and the user plane function entity.

In an implementation, the control plane function entity and the user plane function entity are different devices disposed in the core network.

In an implementation, the control plane function entity is a network function entity of control plane responsible for UE access and service processing.

In an implementation, the user plane function entity is a network function entity of forwarding plane which processes user application data.

In an implementation, in a 5G network, the control plane function entity is an Access Management Function (AMF) entity, and the user plane function entity is a UPF entity.

In another implementation, in an Evolved Packet Core (EPC) network, the control plane function entity is a Mobility Management Entity (MME), and the user plane function entity is a Serving GateWay (SGW) or a Packet GateWay (PGW).

Specific implementation processes of the above embodiments are illustrated in detail below by several specific examples, and it should be noted that the examples illustrated are merely for convenience of description and should not be used to limit the scope of the embodiments of the present disclosure.

Example 1

Figure 6:
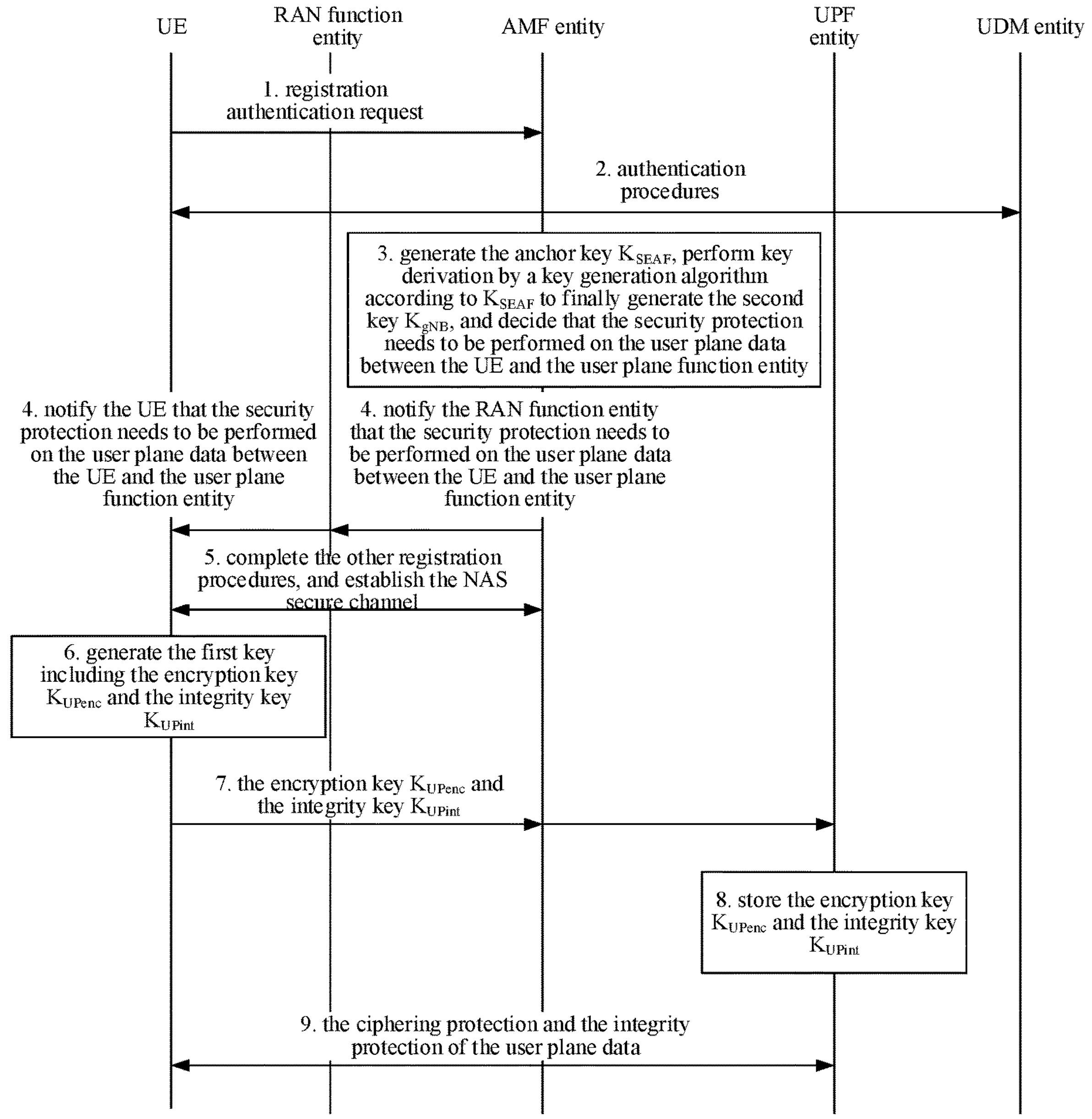
FIG. 6 is a flowchart illustrating a data transmission method according to the present disclosure.

If a virtual network operator providing network services leases an RAN device and the RAN device cannot be trusted by applications, an encrypted channel needs to be directly established between a UE and a device in the core network; or if a plurality of core network operators share the RAN function entity, an encrypted channel also needs to be established between the UE and each core network in order to guarantee data security. In the above scenarios, keys for the ciphering protection and the integrity protection of the user plane data may be generated in a registration authentication stage when the UE accesses the core network, so that the UE may perform encrypted transmission and the integrity protection on the user plane data when the UE performs a service. FIG. 6 shows an implementation flow taking the 5G network as an example. In the present solution, the control plane function entity is an AMF entity, and the user plane function entity is a UPF entity.

1. The UE requests to access the 5G network and sends a registration authentication request to the AMF entity, and the RAN function entity routes the registration authentication request to the AMF entity according to a Subscription Concealed Identifier (SUCI) in the registration authentication request.

2. Authentication procedures among the UE, the AMF entity, an Authentication Server Function (AUSF) entity and a Unified Data Management (UDM) entity are completed. Other registration procedures are performed among the UE, the RAN function entity, and the AMF entity, and reference may be made to the 3GPP TS 23.502 for the details of the registration authentication procedures.

3. After the authentication procedures are completed, the AMF entity generates an anchor key $K_{SEAF}$ and performs key derivation by a key generation algorithm according to $K_{SEAF}$ to finally generate a second key $K_{gNB}$. If the AMF entity decides that the security protection needs to be performed on the user plane data between the UE and the UPF entity (for example, if it is specified in an operator policy or the user subscription information that the security protection needs to be performed on the user plane data between the UE and the UPF entity, the AMF entity decides that the security protection needs to be performed on the user plane data between the UE and the UPF entity according to the operator policy or the user subscription information), and then operation 4 is performed.

4. The AMF entity sends a notification message to the RAN function entity and the UE through an N1 message and/or an N2 message.

5. The other registration procedures between the UE and the RAN function entity and between the UE and the AMF entity are completed, and an NAS secure channel is established between the UE and the AMF entity.

6. The UE generates a first key according to the root key by a hierarchical key derivation algorithm, with the first key including an encryption key $K_{UPenc}$ and an integrity key $K_{UPint}$.

7. The UE sends the encryption key $K_{UPenc}$ and the integrity key $K_{UPint}$ to the AMF entity through the NAS secure channel, and the AMF entity sends the encryption key $K_{UPenc}$ and the integrity key $K_{UPint}$ to the UPF entity. The AMF entity may send the encryption key $K_{UPenc}$ and the integrity key $K_{UPint}$ to the UPF entity through an SMF entity in a PDU session establishment stage.

8. The UPF entity stores the encryption key $K_{UPenc}$ and the integrity key $K_{UPint}$.

9. The ciphering protection and the integrity protection are performed on the user plane data between the UE and the UPF entity, and reference may be made to Example 3 for related procedures.

According to the related technology, the encryption key $K_{UPenc}$ and the integrity key $K_{UPint}$ are generated by the RAN function entity. The above operation 7 may also be replaced with the following operation: the RAN function entity provides the encryption key $K_{UPenc}$ and the integrity key $K_{UPint}$ for the AMF entity through an N2 interface message, and then the AMF entity provides the encryption key $K_{UPenc}$ and the integrity key $K_{UPint}$ for the UPF entity.

The above solution is to perform the security protection on the user plane data between the UE and the 5GC after the UE registers with the 5G network, that is, all the user plane data interchanged between the UE and the 5GC is subjected to the ciphering protection and the integrity protection. The above solution is also applicable to the EPC network where the control plane function entity is an MME, and the user plane function entity is a SGW or a PGW.

Example 2

Figure 7:
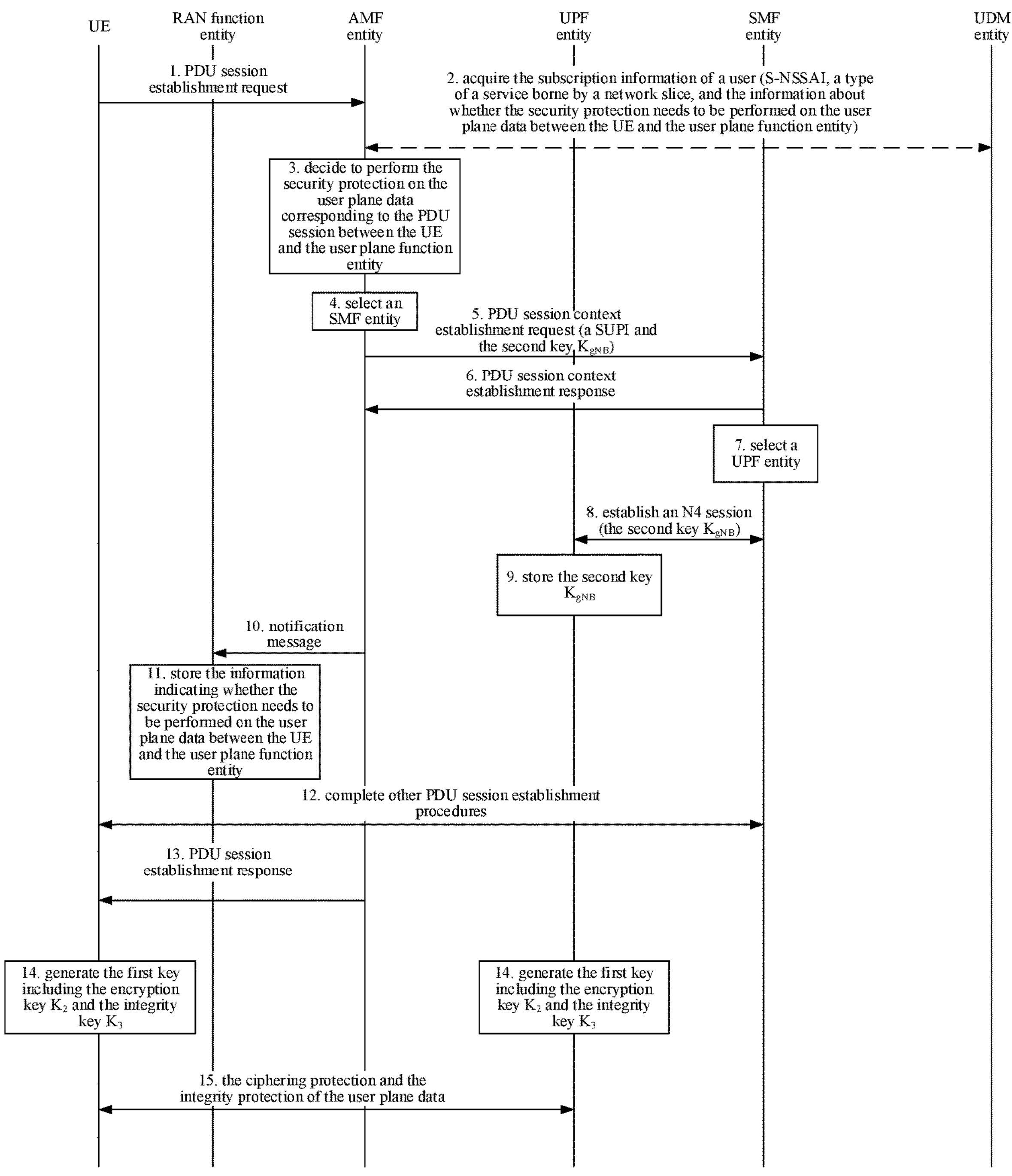
FIG. 7 is a flowchart illustrating a data transmission method according to the present disclosure.

The Example 1 describes performing the security protection on the user plane data between the UE and the 5GC. The 5G network may also provide network services in the form of network slice, that is, the 5GC may include a plurality of network slices. After the UE registers with the 5G network, the UE can access 8 network slices at the most. The Example 2 describes performing the security protection on the user plane data between the UE and the core network at a network slice level, and FIG. 7 shows an implementation process of the Example 2. In the present solution, the control plane function entity is an AMF entity, and the user plane function entity is a UPF entity.

1. After the UE successfully registers with the 5G network, the UE requests to access a network slice of the RAN function entity and sends a PDU session establishment request including NAS information, with the NAS information including Single Network Slice Selection Assistance Information (S-NSSAI), etc. The S-NSSAI includes a network slice identifier of the network slice which the UE is authorized to access. The AMF entity stores the S-NSSAI and other information.

2. After receiving the PDU session establishment request, the AMF entity acquires the subscription information of a user, with the subscription information including authorized S-NSSAI of the user, a type of a service borne by a network slice corresponding to each S-NSSAI, and the information about whether the security protection needs to be performed on the user plane data between the UE and the UPF entity. If the AMF entity does not store the subscription information of the user, the AMF entity acquires the subscription information of the user from a UDM entity.

3. In consideration of the subscription information of the user, the AMF entity decides to perform the security protection on the user plane data corresponding to the PDU session between the UE and the UPF entity.

4. The AMF entity selects an SMF entity according to the information such as the S-NSSAI.

5. The AMF entity sends a PDU session context establishment request to the SMF entity, with the PDU session context establishment request including a Subscription Permanent Identifier (SUPI), a second key $K_{gNB}$ and other information.

6. The SMF entity returns a PDU session context establishment response to the AMF entity.

7. If the PDU session establishment request is sent for the first time in the operation 1, the SMF entity selects a UPF entity; and if the PDU session establishment request is not sent for the first time in the operation 1, operation 9 is directly performed.

8. The SMF entity sends an N4 session establishment request to the selected UPF entity, and provides information such as a process detection rule corresponding to the PDU session and the second key $K_{gNB}$. An N4 session is established between the SMF entity and the UPF entity.

9. The UPF entity stores the second key $K_{gNB}$.

10. The AMF entity performs N2 interface message interaction with the RAN function entity to send the notification message to the RAN function entity.

11. The RAN function entity stores the information indicating whether the security protection needs to be performed on the user plane data between the UE and the UPF entity.

12. Other PDU session establishment procedures among the UE, the RAN function entity, the AMF entity, the SMF entity and the UPF entity are completed.

13. The AMF entity returns a PDU session establishment response to the UE.

14. The UE generates a first key according to the root key by a hierarchical key derivation algorithm, with the first key including an encryption key $K_{UPenc}$ and an integrity key $K_{UPint}$. The UPF entity generates the first key according to the second key $K_{gNB}$ by the same hierarchical key derivation algorithm, with the first key including the encryption key $K_{UPenc}$ and the integrity key $K_{UPint}$.

15. Reference may be made to the Example 3 for a process of performing the ciphering protection and the integrity protection on the user plane data between the UE and the UPF entity.

Example 3

According to whether the AMF entity sends the notification message to the RAN function entity in the Example 1 or the Example 2, the RAN function entity determines whether the encryption, the decryption and the integrity protection need to be performed on the user plane data transmitted between the UE and the UPF entity.

Figure 8:
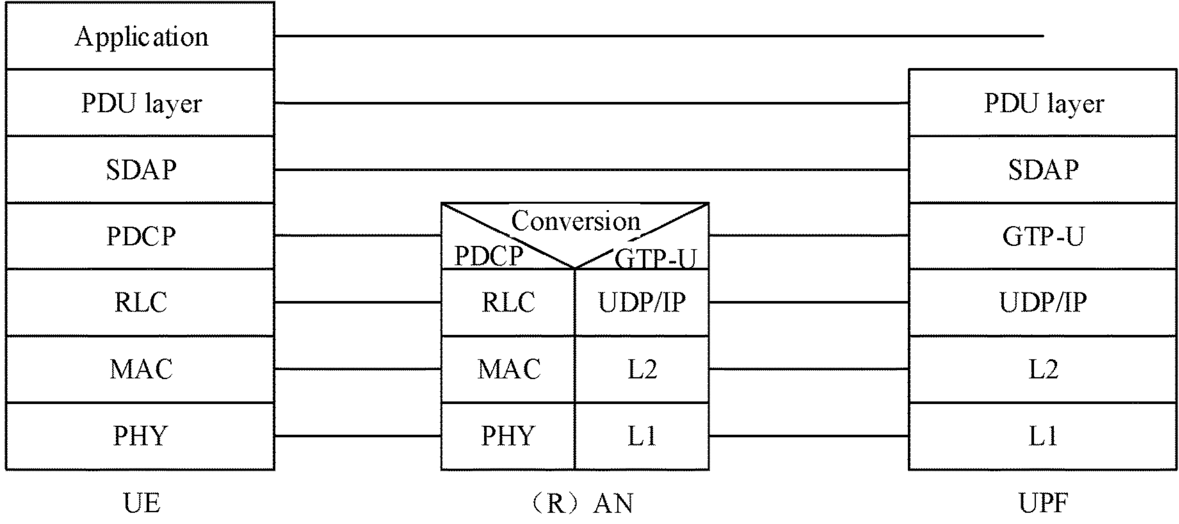
FIG. 8 is a schematic diagram of a protocol stack structure according to the present disclosure.
Figure 9:
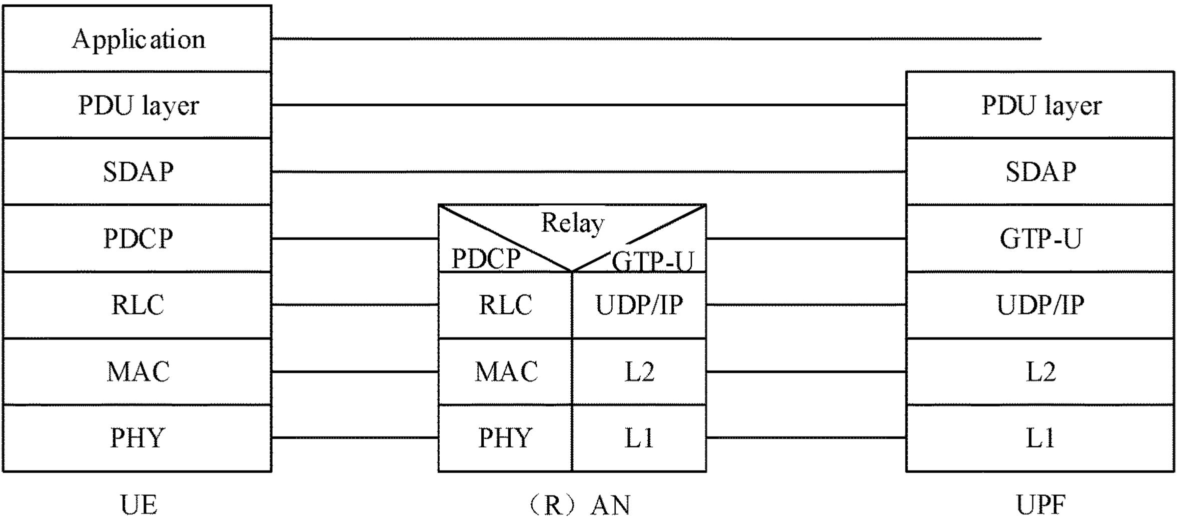
FIG. 9 is a schematic diagram of a protocol stack structure according to the present disclosure.

For the uplink user plane data, the UE completes encapsulation of the transmitted uplink user plane data according to a UE protocol stack shown in FIG. 8 or FIG. 9, and transmits the encapsulated uplink user plane data. Specifically, the uplink user plane data is subjected to application layer encapsulation, the uplink user plane data already subjected to the application layer encapsulation is subjected to PDU layer encapsulation, the uplink user plane data already subjected to the PDU layer encapsulation is subjected to Simple Distribution File System Access Protocol (SDAP) encapsulation, the uplink user plane data already subjected to the SDAP encapsulation is encrypted with $K_{UPenc}$, the encrypted uplink user plane data is subjected to the integrity protection with $K_{UPint}$, the uplink user plane data already subjected to the integrity protection is subjected to the PDCP encapsulation, the uplink user plane data already subjected to the PDCP encapsulation is subjected to Radio Link Control (RLC) encapsulation, the uplink user plane data already subjected to the RLC encapsulation is subjected to Media Access Control (MAC) layer encapsulation, and the uplink user plane data already subjected to the MAC layer encapsulation is subjected to Physical Layer (PHY) encapsulation.

When the uplink user plane data already subjected to the PHY encapsulation is sent to the RAN function entity, the RAN function entity determines whether the uplink user plane data already subjected to the PHY encapsulation belongs to the data interchanged between the UE and the UPF entity; if the uplink user plane data already subjected to the PHY encapsulation belongs to the data interchanged between the UE and the UPF entity, the RAN function entity does not perform the encryption, the decryption, the integrity protection, or the integrity verification on the uplink user plane data already subjected to the PHY encapsulation, and merely completes protocol conversion as shown in FIG. 9. The uplink user plane data already subjected to the PHY encapsulation is first subjected to PHY de-encapsulation, the uplink user plane data already subjected to the PHY de-encapsulation is subjected to MAC layer de-encapsulation, the uplink user plane data already subjected to the MAC layer de-encapsulation is subjected to RLC de-encapsulation, and then the uplink user plane data already subjected to the RLC de-encapsulation is converted into a General Packet Radio Service (GPRS) Tunneling Protocol (GTP) encapsulation format. In the protocol conversion process, the RAN function entity does not perform any processing on the PDCP layer and the layer above the PDCP layer, that is, the RAN function entity does not perform the decryption and the integrity verification on the uplink user plane data. After completing the protocol conversion of the uplink user plane data, the RAN function entity sends the uplink user plane data to the UPF entity.

The UPF entity receives the uplink user plane data already subjected to the protocol conversion, performs L1 layer de-encapsulation on the uplink user plane data already subjected to the protocol conversion, performs L2 layer de-encapsulation on the uplink user plane data already subjected to the L1 layer de-encapsulation, performs GTP-U/User Datagram Protocol (UDP)/Internet Protocol (IP) layer de-encapsulation on the uplink user plane data already subjected to the L2 layer de-encapsulation, performs the PDCP de-encapsulation on the uplink user plane data already subjected to the GTP-U/UDP/IP layer de-encapsulation, performs the integrity verification on the uplink user plane data already subjected to the PDCP de-encapsulation with $K_{UPint}$, decrypts the uplink user plane data already subjected to the PDCP de-encapsulation with $K_{UPenc}$ after the uplink user plane data is verified, performs SDAP de-encapsulation on the decrypted uplink user plane data, and performs PDU layer de-encapsulation on the uplink user plane data already subjected to the SDAP de-encapsulation.

If the uplink user plane data already subjected to the PHY encapsulation does not belong to the data interchanged between the UE and the UPF entity, the RAN function entity first performs, according to the protocol stack of the RAN function entity shown in FIG. 9, the PHY de-encapsulation on the uplink user plane data already subjected the PHY encapsulation, performs the MAC layer de-encapsulation on the uplink user plane data already subjected to the PHY de-encapsulation, performs the RLC de-encapsulation on the uplink user plane data already subjected to the MAC layer de-encapsulation, performs the PDCP de-encapsulation on the uplink user plane data already subjected to the RLC de-encapsulation, performs the integrity verification on the uplink user plane data already subjected to the PDCP de-encapsulation with $K_{UPint}$, decrypts the uplink user plane data with $K_{UPint}$ after the uplink user plane data is verified, and then converts the decrypted uplink user plane data into the GTP encapsulation format. In the protocol conversion process, the RAN function entity does not perform any processing on the SDAP layer and the layer above the SDAP layer. After completing the protocol conversion of the uplink user plane data, the RAN function entity sends the uplink user plane data to the UPF entity.

For the downlink user plane data, the UPF entity completes encapsulation of the transmitted downlink user plane data according to the UE protocol stack shown in FIG. 8, and transmits the encapsulated downlink user plane data. Specifically, the downlink user plane data is subjected to the application layer encapsulation, the downlink user plane data already subjected to the application layer encapsulation is subjected to the PDU layer encapsulation, the downlink user plane data already subjected to the PDU layer encapsulation is subjected to the SDAP encapsulation, the downlink user plane data already subjected to the SDAP encapsulation is encrypted with $K_{UPenc}$, the encrypted downlink user plane data is subjected to the integrity protection with $K_{UPint}$, the downlink user plane data already subjected to the integrity protection is subjected to the PDCP encapsulation, the downlink user plane data already subjected to the PDCP encapsulation is subjected to the GTP-U/UDP/IP encapsulation, the downlink user plane data already subjected to the GTP-U/UDP/IP encapsulation is subjected to the L2 layer encapsulation, and the downlink user plane data already subjected to the L2 layer encapsulation is subjected to the L1 layer encapsulation.

Alternatively, the UPF entity completes the encapsulation of the transmitted downlink user plane data according to a UE protocol stack shown in FIG. 9, and transmits the encapsulated downlink user plane data. Specifically, the downlink user plane data is subjected to the application layer encapsulation, the downlink user plane data already subjected to the application layer encapsulation is subjected to the PDU layer encapsulation, the downlink user plane data already subjected to the PDU layer encapsulation is subjected to the SDAP encapsulation, the downlink user plane data already subjected to the SDAP encapsulation is subjected to GTP-U encapsulation, the downlink user plane data already subjected to the GTP-U encapsulation is subjected to UDP/IP encapsulation, the downlink user plane data already subjected to the UDP/IP encapsulation is subjected to the L2 layer encapsulation, and the downlink user plane data already subjected to the L2 layer encapsulation is subjected to the L1 layer encapsulation.

When the downlink user plane data already subjected to the L1 layer encapsulation is sent to the RAN function entity, the RAN function entity determines whether the downlink user plane data already subjected to the L1 layer encapsulation belongs to the data interchanged between the UE and the UPF entity; if the downlink user plane data already subjected to the L1 layer encapsulation belongs to the data interchanged between the UE and the UPF entity, the RAN function entity does not perform the encryption, the decryption, the integrity protection, or the integrity verification on the downlink user plane data already subjected to the L1 layer encapsulation, and merely completes the protocol conversion of the downlink user plane data already subjected to the L1 layer encapsulation as shown in FIG. 9. The downlink user plane data already subjected to the L1 layer encapsulation is first subjected to the L1 layer de-encapsulation, the downlink user plane data already subjected to the L1 layer de-encapsulation is subjected to the L2 layer de-encapsulation, the downlink user plane data already subjected to the L2 layer de-encapsulation is subjected to the GTP-U/UDP/IP de-encapsulation, and then the downlink user plane data already subjected to the GTP-U/UDP/IP de-encapsulation is converted into the RLC encapsulation format. In the protocol conversion process, the RAN function entity does not perform any processing on the PDCP layer and the layer above the PDCP layer, that is, the RAN function entity does not perform the decryption and the integrity verification on the downlink user plane data. After completing the protocol conversion of the downlink user plane data, the RAN function entity sends the downlink user plane data to the UPF entity.

The UE receives the downlink user plane data already subjected to the protocol conversion, performs the PHY de-encapsulation on the downlink user plane data already subjected to the protocol conversion, performs the MAC layer de-encapsulation on the downlink user plane data already subjected to the PHY de-encapsulation, performs the RLC de-encapsulation on the downlink user plane data already subjected to the MAC layer de-encapsulation, performs the PDCP de-encapsulation on the downlink user plane data already subjected to the RLC de-encapsulation, performs the integrity verification on the downlink user plane data already subjected to the PDCP de-encapsulation with $K_{UPint}$, decrypts the downlink user plane data already subjected to the PDCP de-encapsulation with $K_{UPenc}$ after the downlink user plane data is verified, performs the SDAP de-encapsulation on the decrypted downlink user plane data, and performs the PDU layer de-encapsulation on the downlink user plane data already subjected to the SDAP de-encapsulation.

If the downlink user plane data already subjected to the L1 layer encapsulation does not belong to the data interchanged between the UE and the UPF entity, the RAN function entity first performs, according to the protocol stack of the RAN function entity shown in FIG. 9, the L1 layer de-encapsulation on the downlink user plane data already subjected the L1 layer encapsulation, performs the L2 layer de-encapsulation on the downlink user plane data already subjected to the L1 layer de-encapsulation, performs UDP/IP de-encapsulation on the downlink user plane data already subjected to the L2 layer de-encapsulation, performs the GTP-U de-encapsulation on the downlink user plane data already subjected to the UDP/IP de-encapsulation, and converts the downlink user plane data already subjected to the GTP-U de-encapsulation into the RLC encapsulation format. In the protocol conversion process, the RAN function entity does not perform any processing on the SDAP layer and the layer above the SDAP layer. After completing the protocol conversion of the downlink user plane data, the RAN function entity sends the downlink user plane data to the UE.

The present disclosure further provides an electronic device, including: at least one processor; and a memory having at least one program stored thereon. When the at least one program is executed by the at least one processor, the at least one processor is caused to perform at least one operation of the data transmission methods provided by the present disclosure.

The processor is a device having data processing capability, and includes, but is not limited to, a Central Processing Unit (CPU); and the memory is a device having data storage capability, and includes, but is not limited to, a Random Access Memory (RAM, more specifically, a Synchronous Dynamic RAM (SDRAM), a Data Direction Register, a Double Data Rate SDRAM (DDR SDRAM), etc.), a Read-Only Memory (ROM), an Electrically Erasable Programmable Read-Only Memory (EEPROM), and a flash memory (FLASH).

In an implementation, the processor and the memory are connected to each other through a bus, and then are connected to other components of the electronic device.

The present disclosure further provides a computer-readable storage medium having a computer program stored thereon. Where the computer program is executed by a processor, at least one operation of the data transmission methods provided by embodiments of the present disclosure is performed.

Figure 10:
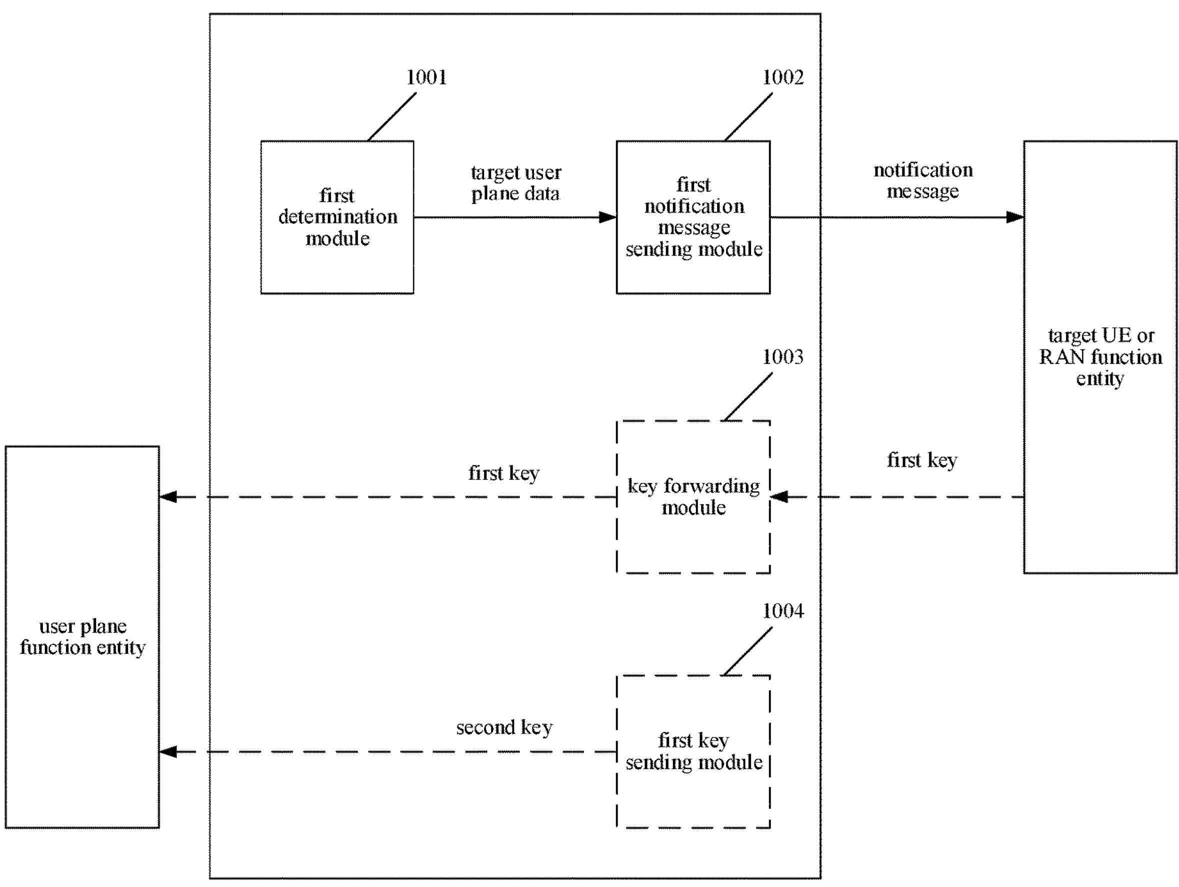
FIG. 10 is a block diagram of a data transmission device according to the present disclosure.

The present disclosure further provides a data transmission device applicable to a control plane function entity, or may be specifically implemented as the control plane function entity. With reference to FIG. 10 which is a block diagram of the data transmission device according to the present disclosure, the data transmission device may include: a first determination module 1001 and a first notification message sending module 1002.

The first determination module 1001 is configured to determine target user plane data which needs to be subjected to security protection between a target UE and a user plane function entity.

The first notification message sending module 1002 is configured to send a notification message to an RAN function entity and the target UE, with the notification message configured to instruct that the security protection is performed on the target user plane data between the target UE and the user plane function entity.

In an implementation, the data transmission device may further include: a key forwarding module 1003 configured to receive a first key returned from the target UE or the RAN function entity, and send the first key to the user plane function entity; and the first key is configured to be used by the user plane function entity and the target UE to perform the security protection on the target user plane data between the target UE and the user plane function entity.

In an implementation, the first key may include a ciphering key and/or an integrity key.

In an implementation, the data transmission device may further include: a first key sending module 1004 configured to generate a second key, and send the second key to the user plane function entity; and the second key is configured to be used by the user plane function entity to generate the first key.

A specific implementation process of the data transmission device is the same as that of the above data transmission method for the side of the control plane function entity, and thus will not be repeated here.

Figures 11, 12:
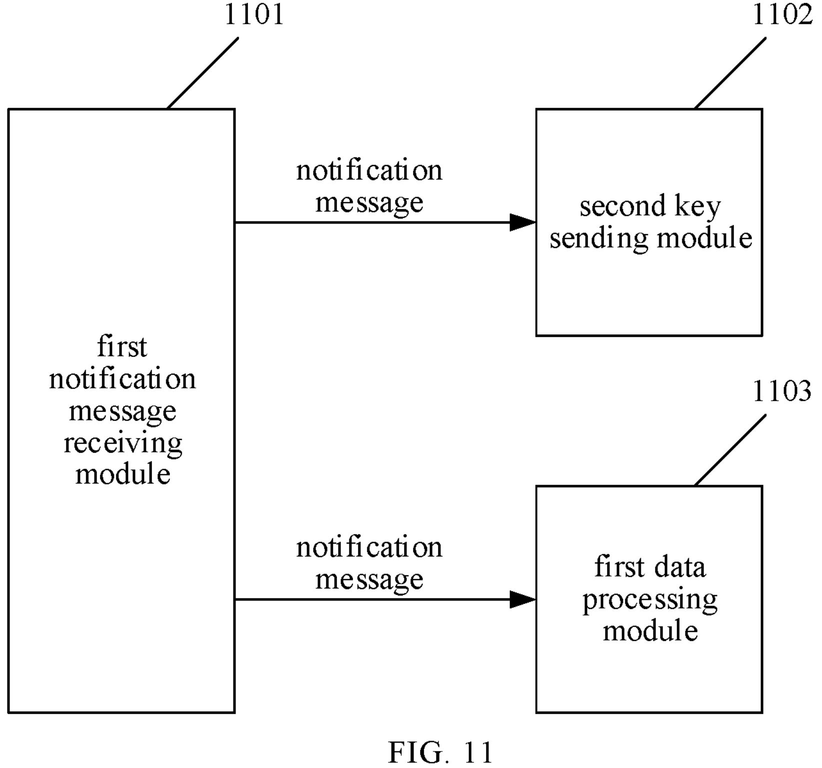
FIG. 11 is a block diagram of a data transmission device according to the present disclosure.
FIG. 12 is a block diagram of a data transmission device according to the present disclosure.

The present disclosure further provides a data transmission device applicable to an RAN function entity, or may be specifically implemented as the RAN function entity. With reference to FIG. 11 which is a block diagram of the data transmission device according to the embodiment of the present disclosure, the data transmission device may include: a first notification message receiving module 1101.

The first notification message receiving module 1101 is configured to receive a notification message sent by a control plane function entity, with the notification message configured to instruct that security protection is performed on target user plane data between a target UE and a user plane function entity.

In an implementation, the data transmission device may further include: a second key sending module 1102 configured to send a first key to the control plane function entity; and the first key is a key for performing the security protection on the target user plane data between the target UE and the user plane function entity.

In an implementation, the data transmission device may further include: a first data processing module 1103 configured to determine whether user plane data received by the RAN function entity is the target user plane data according to the notification message, and, if the user plane data received by the RAN function entity is the target user plane data, perform protocol conversion on the target user plane data and then forward the target user plane data, without performing the security protection on the target user plane data.

A specific implementation process of the data transmission device is the same as that of the above data transmission method for the side of the RAN function entity, and thus will not be repeated here.

The present disclosure further provides a data transmission device applicable to a user plane function entity, or may be specifically implemented as the user plane function entity. With reference to FIG. 12 which is a block diagram of the data transmission device according to the embodiment of the present disclosure, the data transmission device may include: a key acquisition module 1201 and a second data processing module 1202.

The key acquisition module 1201 is configured to receive a first key sent by a control plane function entity, or receive a second key sent by the control plane function entity and generate the first key according to the second key.

The second data processing module 1202 is configured to perform security protection on target user plane data transmitted between a target UE and the user plane function entity with the first key.

In an implementation, the second data processing module 1202 is specifically configured to: encrypt, with a ciphering key, the target user plane data sent to the target UE, and decrypt, with the ciphering key, the target user plane data received from the target UE.

In another implementation, the second data processing module 1202 is specifically configured to: perform, with an integrity key, integrity protection on the target user plane data sent to the target UE, and perform, with the integrity key, integrity verification on the target user plane data received from the target UE.

In another implementation, the second data processing module 1202 is specifically configured to: encrypt, with the ciphering key, the target user plane data sent to the target UE, and perform, with the integrity key, the integrity protection on the target user plane data.

In another implementation, the second data processing module 1202 is specifically configured to: perform, with the integrity key, the integrity verification on the target user plane data received from the target UE, and decrypt, with the ciphering key, the target user plane data after the target user plane data is verified.

A specific implementation process of the data transmission device is the same as that of the above data transmission method for the side of the user plane function entity, and thus will not be repeated here.

Figures 13, 14:
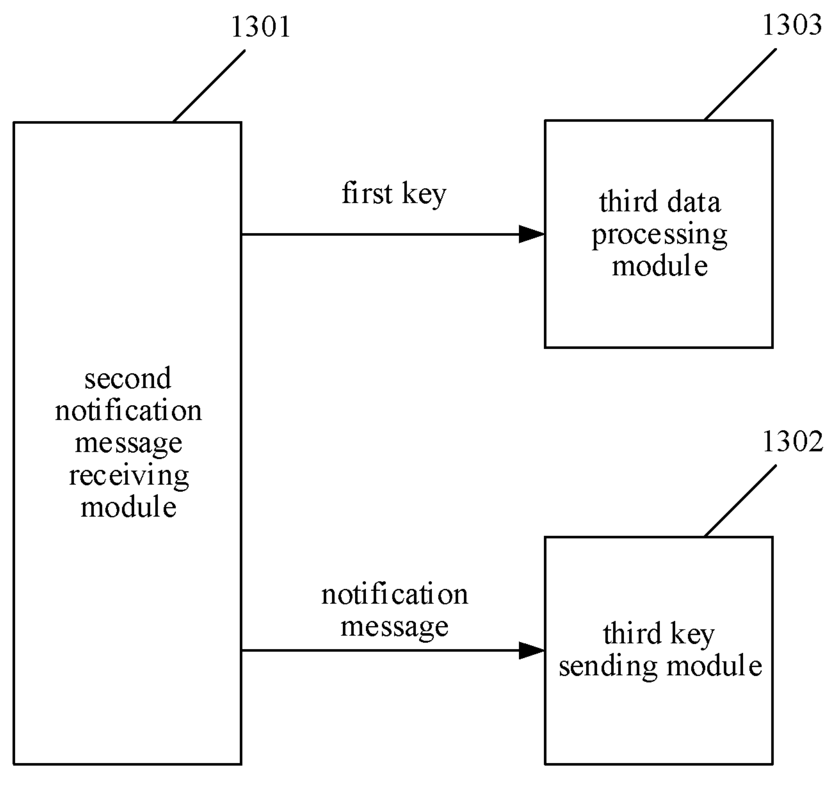
FIG. 13 is a block diagram of a data transmission device according to the present disclosure.
FIG. 14 is a block diagram of a data transmission system according to the present disclosure.

The present disclosure further provides a data transmission device applicable to a UE, or may be specifically implemented as the UE. With reference to FIG. 13 which is a block diagram of the data transmission device according to the embodiment of the present disclosure, the data transmission device may include a second notification message receiving module 1301.

The second notification message receiving module 1301 is configured to receive a notification message sent by a control plane function entity, with the notification message configured to instruct that security protection is performed on target user plane data between the UE and a user plane function entity.

In an implementation, the data transmission device may further include: a third key sending module 1302 configured to generate a first key and send the first key to the control plane function entity; and the first key includes a ciphering key and/or an integrity key.

In an implementation, the data transmission device may further include: a third data processing module 1303 configured to encrypt, with the ciphering key, the target user plane data sent to the user plane function entity, and decrypt, with the ciphering key, the target user plane data received from the user plane function entity.

In another implementation, the third data processing module 1303 may be further configured to perform, with the integrity key, integrity protection on the target user plane data sent to the user plane function entity, and perform, with the integrity key, integrity verification on the target user plane data received from the user plane function entity.

In another implementation, the third data processing module 1303 may be further configured to encrypt, with the ciphering key, the target user plane data sent to the user plane function entity, and perform, with the integrity key, the integrity protection on the encrypted target user plane data.

In another implementation, the third data processing module 1303 may be further configured to perform, with the integrity key, the integrity verification on the target user plane data received from the user plane function entity, and decrypt, with the ciphering key, the target user plane data after the target user plane data is verified.

A specific implementation process of the data transmission device is the same as that of the above data transmission method applied for the side of the UE, and thus will not be repeated here.

The present disclosure further provides a data transmission system. With reference to FIG. 14 which is a block diagram of the data transmission system according to the embodiment of the present disclosure, the data transmission system may include: a control plane function entity 1401, an RAN function entity 1402 and a target UE 1403.

The control plane function entity 1401 is configured to determine target user plane data which needs to be subjected to security protection between the target UE 1403 and a user plane function entity 1404, and send a notification message to the RAN function entity 1402 and the target UE 1403. The notification message is configured to instruct that the security protection is performed on the target user plane data between the target UE 1403 and the user plane function entity 1404.

The RAN function entity 1402 is configured to receive the notification message sent by the control plane function entity 1401.

The target UE 1403 is configured to receive the notification message sent by the control plane function entity 1401.

In an implementation, the control plane function entity 1401 is further configured to: receive a first key returned from the target UE 1403 or the RAN function entity 1402, and send the first key to the user plane function entity 1404; and the first key is configured to be used by the user plane function entity 1404 and the target UE 1403 to perform the security protection on the target user plane data between the target UE 1403 and the user plane function entity 1404.

The target UE 1403 is further configured to generate the first key and send the first key to the control plane function entity 1401; and the first key includes a ciphering key and/or an integrity key.

The RAN function entity 1402 is further configured to send the first key to the control plane function entity 1401.

In an implementation, the control plane function entity 1401 is further configured to generate a second key and send the second key to the user plane function entity 1404; and the second key is configured to be used by the user plane function entity 1404 to generate the first key.

The data transmission system may further include: the user plane function entity 1404 configured to receive the second key sent by the control plane function entity 1401 and generate the first key according to the second key.

In an implementation, the target UE 1403 is further configured to: perform the security protection on the target user plane data transmitted between target UE 1403 and the user plane function entity 1404 with the first key.

The user plane function entity 1404 is further configured to perform, with the first key, the security protection on the target user plane data transmitted between target UE 1403 and the user plane function entity 1404.

A specific implementation process of the data transmission system is the same as the specific implementation processes of the above data transmission methods, and thus will not be repeated here.

It should be understood by those of ordinary skill in the art that the functional modules/units in all or some of the operations, the systems and the devices in the methods disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term “computer storage medium” includes volatile/nonvolatile and removable/non-removable media used in any method or technology for storing information (such as computer-readable instructions, data structures, program modules and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A data transmission method applicable to a control plane function entity, comprising:

determining target user plane data which needs to be subjected to security protection between a target user equipment and a user plane function entity;

sending a notification message to a Radio Access Network function entity and the target user equipment; and receiving a first key generated by the target user equipment, and sending the first key to the user plane function entity, wherein the notification message is configured to instruct that the security protection is performed on the target user plane data between the target user equipment and the user plane function entity, and wherein the first key is configured to be directly used by the user plane function entity and the target user equipment to perform the security protection on the target user plane data between the target user equipment and the user plane function entity.

2. The method of claim 1, wherein the first key comprises a ciphering key and/or an integrity key.

3. An electronic device, comprising:

at least one processor; and a memory having at least one program stored thereon, wherein when the at least one program is executed by the at least one processor, cause the at least one processor to implement the data transmission method of claim 1.

4. A non-transitory computer-readable storage medium having a computer program stored thereon, wherein when the computer program is executed by a processor, cause the processor to implement the data transmission method of claim 1.

5. A data transmission method applicable to a user plane function entity, comprising:

receiving a first key sent by a control plane function entity, wherein the first key is configured to be directly used by the user plane function entity and a target user equipment to perform security protection on target user plane data between the target user equipment and the user plane function entity, the first key is generated by the target user equipment and is returned to the control plane function entity by the target user equipment; and performing the security protection on the target user plane data transmitted between the target user equipment and the user plane function entity with the first key.

6. The method of claim 5, wherein the first key comprises a ciphering key and/or an integrity key; and performing the security protection on the target user plane data transmitted between the target user equipment and the user plane function entity with the first key comprises:

encrypting, with the ciphering key, first target user plane data sent to the target user equipment; and decrypting, with the ciphering key, second target user plane data received from the target user equipment; or performing, with the integrity key, integrity protection on the first target user plane data sent to the target user equipment; and performing, with the integrity key, integrity verification on the second target user plane data received from the target user equipment; or encrypting, with the ciphering key, the first target user plane data sent to the target user equipment, and performing, with the integrity key, the integrity protection on the first target user plane data; or performing, with the integrity key, the integrity verification on the second target user plane data received from the target user equipment, and decrypting, with the ciphering key, the second target user plane data after the second target user plane data is verified.

7. An electronic device, comprising:

at least one processor; and a memory having at least one program stored thereon, wherein when the at least one program is executed by the at least one processor, cause the at least one processor to implement the data transmission method of claim 5.

8. A non-transitory computer-readable storage medium having a computer program stored thereon, wherein when the computer program is executed by a processor, cause the processor to implement the data transmission method of claim 5.

* * * * *